(Model.)

D. M. PARRY.
FORCE FEED GRAIN DRILL.

No. 260,315.          Patented June 27, 1882.

WITNESSES.
James B. Lizius.
R. P. Daggett.

INVENTOR.
David M. Parry,
PER
C. Bradford.
ATTORNEY.

N. PETERS. Photo-Lithographer. Washington, D. C.

UNITED STATES PATENT OFFICE.

DAVID M. PARRY, OF RUSHVILLE, INDIANA.

FORCE-FEED GRAIN-DRILL.

SPECIFICATION forming part of Letters Patent No. 260,315, dated June 27, 1882.

Application filed September 21, 1881. (Model.)

*To all whom it may concern:*

Be it known that I, DAVID M. PARRY, of the town of Rushville, county of Rush, and State of Indiana, have invented certain new and useful Improvements in Means for Regulating the Passage of Seed through Force-Feed Grain-Drills, of which the following is a specification.

My said invention consists in combining with the feed-cup and corrugated roll, which are usual in a machine of this character, a series of fingers which occupy a position in close proximity to said roll and prevent the grain from passing through the machine in greater quantities than is contemplated in its construction, as will hereinafter be more fully explained.

I am fully aware that a plate occupying substantially the same position and relation to a drill of substantially this character as do my fingers has been used. I am also aware that fingers have been used with a feed-wheel mounted on a vertical shaft. I therefore desire to say that I confine myself to a device, substantially as shown, which not only has several fingers, but wherein both the fingers and the feed-wheel are mounted on horizontal rods or shafts. The advantages of this construction and arrangement will be made apparent in the further description thereof.

Figure 1:
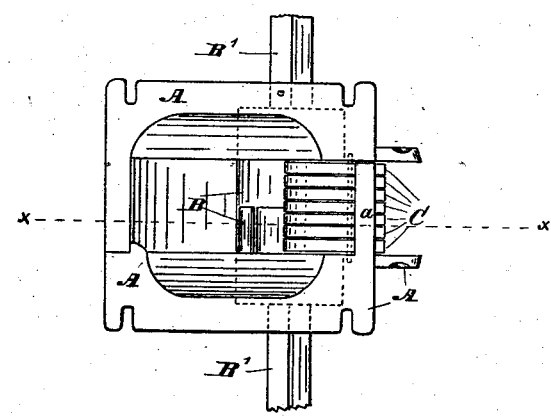
Figure 2:
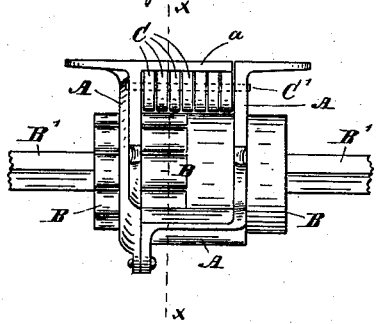

Referring to the accompanying drawings, which are made a part hereof, and on which similar letters of reference indicate similar parts, Figure 1 is a top or plan view of a feed-cup embodying my invention; Fig. 2, a rear elevation thereof, and Fig. 3 a vertical sectional view as seen when looking to the right from the dotted line $x$ $x$ in Fig. 2 and upwardly from the same line in Fig. 1.

In said drawings, the portions marked A represent the feed-cup; B, the feed roll or wheel, mounted on its shaft B'; and C, the fingers mounted on a pivot, C', which fingers are the principal feature of my invention.

The feed-cup A is similar to the usual well-known devices of this character, except that an open space is left above the wheel B for the reception of the fingers C.

Figure 3:
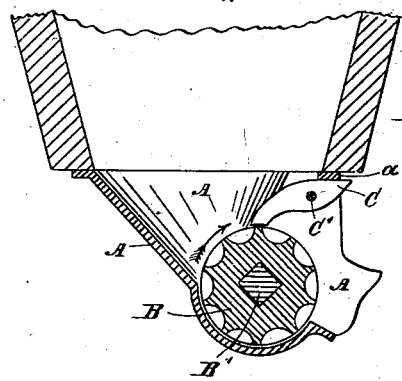

The wheel B is a well-known form of feed-wheel, and operates in like manner, as usual, except that it more commonly revolves in the direction to discharge the seed from the under side, while in my invention it should revolve in the other direction, as indicated by the arrow in Fig. 3, and discharge the seed over the top.

The fingers C are a series of thin straight pieces of metal, of suitable form and size, which are mounted loosely on the pivot C'. Their forward ends come nearly or quite in contact with the wheel or roll B, and their rear ends extend under and rest against the bar $a$, which prevent them from falling down into the depressions in the surface of said wheel as it revolves. These fingers intercept the grain above the level of the tops of the cups or corrugations in the roll or wheel B, and an even discharge of seed is thereby secured. Pivoted fingers or pieces are preferable for this purpose to a solid edge upon the cup A, for the reason that the latter will, when a seed gets caught between it and the wheel, often crush and destroy it, while the pivoted piece will raise a sufficient distance to allow it to pass under without crushing it.

Several pivoted fingers are better than a single device which might occupy the same position, for the reason that where only one device is used if a single seed should get in between it and the periphery of the roll it would open a space, into which several seeds would probably enter, and through which they might pass, while the narrow finger would probably under the same circumstances only allow a single seed to escape. The construction shown is therefore the most perfect means of securing an even flow of seed of any of those named, or of which I have any knowledge, which is free from the danger of destroying a portion of it.

Having thus fully described my said invention, what I claim as new, and desire to secure by Letters Patent, is—

The combination of the feed-cup A, feed-wheel B, horizontal shaft B' for said wheel, the several fingers C, and the horizontal rod or pivot C', on which said fingers are mounted, all substantially as shown and described, and for the purposes specified.

In witness whereof I have hereunto set my hand and seal, at Rushville, Indiana, this 16th day of September, A. D. 1881.

DAVID M. PARRY. [L. S.]

In presence of—
 E. PAYNE,
 BEN. L. SMITH.